United States Patent
Chintalapalli Patta et al.

(10) Patent No.: US 11,642,797 B2
(45) Date of Patent: May 9, 2023

(54) GRIPPER APPARATUS FOR GRASPING OBJECTS

(71) Applicant: Tata Consultancy Services Limited, Mumbai (IN)

(72) Inventors: Venkat Raju Chintalapalli Patta, Banaglore (IN); Aaditya Asati, Banaglore (IN); Swagat Kumar, Bangalore (IN)

(73) Assignee: Tata Consultancy Services Limited, Mumbai (IN)

(*) Notice: Subject to any disclaimer, the term of this patent is extended or adjusted under 35 U.S.C. 154(b) by 336 days.

(21) Appl. No.: 17/013,340

(22) Filed: Sep. 4, 2020

(65) Prior Publication Data
US 2021/0291384 A1    Sep. 23, 2021

(30) Foreign Application Priority Data
Mar. 19, 2020 (IN) .............................. 202021012003

(51) Int. Cl.
*B25J 15/00* (2006.01)
*B25J 15/06* (2006.01)
(Continued)

(52) U.S. Cl.
CPC ........... *B25J 15/106* (2013.01); *B25J 13/083* (2013.01); *B25J 15/0052* (2013.01); *B25J 15/0253* (2013.01); *B25J 15/0683* (2013.01)

(58) Field of Classification Search
CPC  B25J 15/0004; B25J 15/0052; B25J 15/0253; B25J 15/0616; B25J 15/106;
(Continued)

(56) References Cited

U.S. PATENT DOCUMENTS 4,132,318 A * 1/1979 Wang ..................... B25J 9/0015
                                                                                414/21
5,050,919 A * 9/1991 Yakou .................... B25J 15/026
                                                                               294/185
(Continued)

FOREIGN PATENT DOCUMENTS

AU          754768 B2    11/2002
EP          2029459 B1   10/2009
FR          2723732 A1   10/1996

*Primary Examiner* — Dean J Kramer
(74) *Attorney, Agent, or Firm* — Finnegan, Henderson, Farabow, Garrett & Dunner, LLP

(57) ABSTRACT

Object manipulation in warehouses and logistics facilities is a challenging task because of the unstructured environment. The unstructured environment can have items/objects with different form factors, weight, shape, and size. Traditionally, multiple robots have been used to handle for specific task to be performed by an individual robot which requires high floor. This leads to higher cost and infrastructure. Embodiments of the present disclosure provide a gripper apparatus that addresses a single gripper design handling multiple parcels, wherein the apparatus consists of 'm' fingers parallel to each other and can be independently controlled through actuators, each finger has a force sensors feedback and also actuators which are controlled with force. Each finger comprises a linear slider for actuation for gripping objects and wherein bottom fingers are moved to provide enough gravity support. Further, apparatus comprises bellows attached to each finger end for grasping object using pneumatic grasping mechanism.

12 Claims, 13 Drawing Sheets

(51) Int. Cl.
*B25J 15/10* (2006.01)
*B25J 13/08* (2006.01)
*B25J 15/02* (2006.01)

(58) Field of Classification Search
CPC ...... B25J 13/082; B25J 13/083; B25J 9/1633; B25J 9/1697
See application file for complete search history.

(56) References Cited

U.S. PATENT DOCUMENTS

| | | | |
|---|---|---|---|
| 6,015,174 A * | 1/2000 | Raes | B25J 15/0253 |
| | | | 294/185 |
| 7,547,052 B2 * | 6/2009 | Yohe | B65G 47/90 |
| | | | 294/197 |
| 8,056,949 B1 | 11/2011 | Shaker et al. | |
| 8,965,563 B2 | 2/2015 | Eldershaw et al. | |
| 9,205,558 B1 * | 12/2015 | Zevenbergen | B25J 15/0052 |
| 10,046,462 B2 | 8/2018 | Knopf et al. | |
| 10,265,865 B2 * | 4/2019 | Chinatalapalli Patta | |
| | | | B25J 15/0616 |
| 10,556,338 B1 * | 2/2020 | Marchese | B25J 9/1612 |
| 2017/0057664 A1 | 3/2017 | Soudbakhsh | |

* cited by examiner

GRIPPER APPARATUS FOR GRASPING OBJECTS

PRIORITY CLAIM

This U.S. patent application claims priority under 35 U.S.C. § 119 to: India Application No. 202021012003, filed on Mar. 19, 2020. The entire contents of the aforementioned application are incorporated herein by reference.

TECHNICAL FIELD

The disclosure herein generally relates to a gripper apparatus, and, more particularly, to gripper apparatus for grasping objects.

BACKGROUND

Object manipulation in warehouses (e.g., pick and drop of parcels) and logistics facilities (e.g., postal services) is a challenging task because of the unstructured environment. The unstructured environment can have items/objects with different form factors, weight, shape, and size. Even packaging can be different for a different item/object which makes the manipulation a very challenging task to automate. In such scenario traditionally human beings do sorting and arranging in large container(s). Multiple robots can be used to handle for specific task to be performed by an individual robot which requires high floor. This also leads to higher cost and infrastructure. A single robot can also be used to handle different category of items by changing the end effector extension. However, such conventional approaches for handling objects require high idle time. Large floor area, high idle time contribute to low productivity.

SUMMARY

Embodiments of the present disclosure present technological improvements as solutions to one or more of the above-mentioned technical problems recognized by the inventors in conventional systems. For example, in one aspect, there is provided a gripper apparatus for grasping one or more objects. The gripper apparatus comprises: a mounting adaptor comprising an inner surface and an outer surface; a first actuator and a second actuator mounted on the inner surface of the mounting adaptor using a plurality of screws; a plurality of clamp supporting members, wherein each of the plurality of clamp supporting members is coupled to at least one of the first actuator and the second actuator; a plurality of grasping clamps, wherein a first set of grasping clamps are coupled to a first clamp supporting member of the plurality of clamp supporting members, wherein a second set of grasping clamps are coupled to a second clamp supporting member of the plurality of clamp supporting members, and wherein a third set of grasping clamps are coupled to a third clamp supporting member of the plurality of clamp supporting members, and wherein each grasping clamp from each of the first set of grasping clamps, the second set of grasping clamps and the third set of grasping clamps is positioned opposite to one another; at least one sliding friction pad attached to a corresponding inner surface of each of the plurality of grasping clamps; at least one grasping finger coupled at one end of each grasping clamp of the plurality of grasping clamps, wherein the at least one grasping finger comprises a suction cup; and at least one sensor array positioned between (i) each grasping clamp of the plurality of grasping clamps and (ii) the at least one sliding friction pad, wherein during grasping of the at least one object in real time, the plurality of clamp supporting members are actuated by at least one of the first actuator and the second actuator for movement in at least one direction based on one or more grasping points being estimated, wherein the one or more grasping points are estimated using captured information by an electronic device, and wherein the captured information comprises size, shape, surface, and an orientation of the at least one object, wherein each of the plurality of grasping clamps is actuated for expansion or collapsing based on (i) the movement of the plurality of clamp supporting members in real-time and (ii) an amount of collapsing and expansion of the plurality of grasping clamps being estimated based on the captured information by one or more hardware processors, wherein the at least one sliding friction pad is actuated to slide from one position to another position until center of gravity is determined, based on sensory information received from the at least one sensor array pertaining to force applied on the at least one object, wherein based on the determined center of gravity, the at least one grasping finger is configured for at least one of expansion or collapse to change an associated initial position to another position to firmly grasp the at least one object, or the suction cup is triggered to firmly grasp the at least one object based on the captured information.

In an embodiment, the at least one of the first actuator and the second actuator are actuated until a force sensor feedback is obtained from the at least one grasping finger coupled at each of the plurality of grasping clamps.

In an embodiment, the at least one object is displaced from an initial position to a desired position using a linear slider mechanism of the at least one grasping finger coupled at each of the plurality of grasping clamps.

In an embodiment, the at least one grasping finger is a variable angle controlling finger.

In an embodiment, the force sensor feedback comprises information specific to contact force and one or more slipping parameters associated with grasping of the at least one object in real time.

In an embodiment, the first actuator and the second actuator are one of a hydraulic actuator or a pneumatic actuator.

In another aspect, there is provided a method for grasping one or more objects using a gripper apparatus. The method comprises: obtaining, information of at least one object to be grasped, wherein the information comprises size, shape, surface, and an orientation of the at least one object; estimating (i) one or more grasping points, and (ii) an amount of collapsing and expansion of a plurality of grasping clamps, based on the captured information; grasping the at least one object by: actuating at least one of a first actuator and a second actuator of the gripper apparatus for movement of a plurality of clamp supporting members of the gripper apparatus in at least one direction based on the estimated one or more grasping points; actuating the plurality of grasping clamps of the gripper apparatus for expansion or collapsing based on (i) the movement of the plurality of clamp supporting members in real-time and (ii) the estimated amount of collapsing and expansion of the plurality of grasping clamps; actuating at least one sliding friction pad, attached to a corresponding inner surface of each of the plurality of grasping clamps, to slide from one position to another position until center of gravity is determined, based on sensory information received from at least one sensor array pertaining to force applied on the at least one object; and based on the determined center of gravity, actuating (i) at least one grasping finger of each of the plurality of grasping clamps for at least one of expansion or collapse to change an associated initial position to another position to firmly grasp the at least one object or (ii) a suction cup attached to the at least one grasping finger to firmly grasp the at least one object based on the captured information.

In an embodiment, the at least one of the first actuator and the second actuator are actuated until a force sensor feedback is obtained from the at least one grasping finger coupled at each of the plurality of grasping clamps.

In an embodiment, the at least one object is displaced from an initial position to a desired position using a linear slider mechanism of the at least one grasping finger coupled at each of the plurality of grasping clamps.

In an embodiment, the at least one grasping finger is a variable angle controlling finger.

In an embodiment, the force sensor feedback comprises information specific to contact force and one or more slipping parameters associated with grasping of the at least one object in real time.

In an embodiment, the first actuator and the second actuator are one of a hydraulic actuator or a pneumatic actuator.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
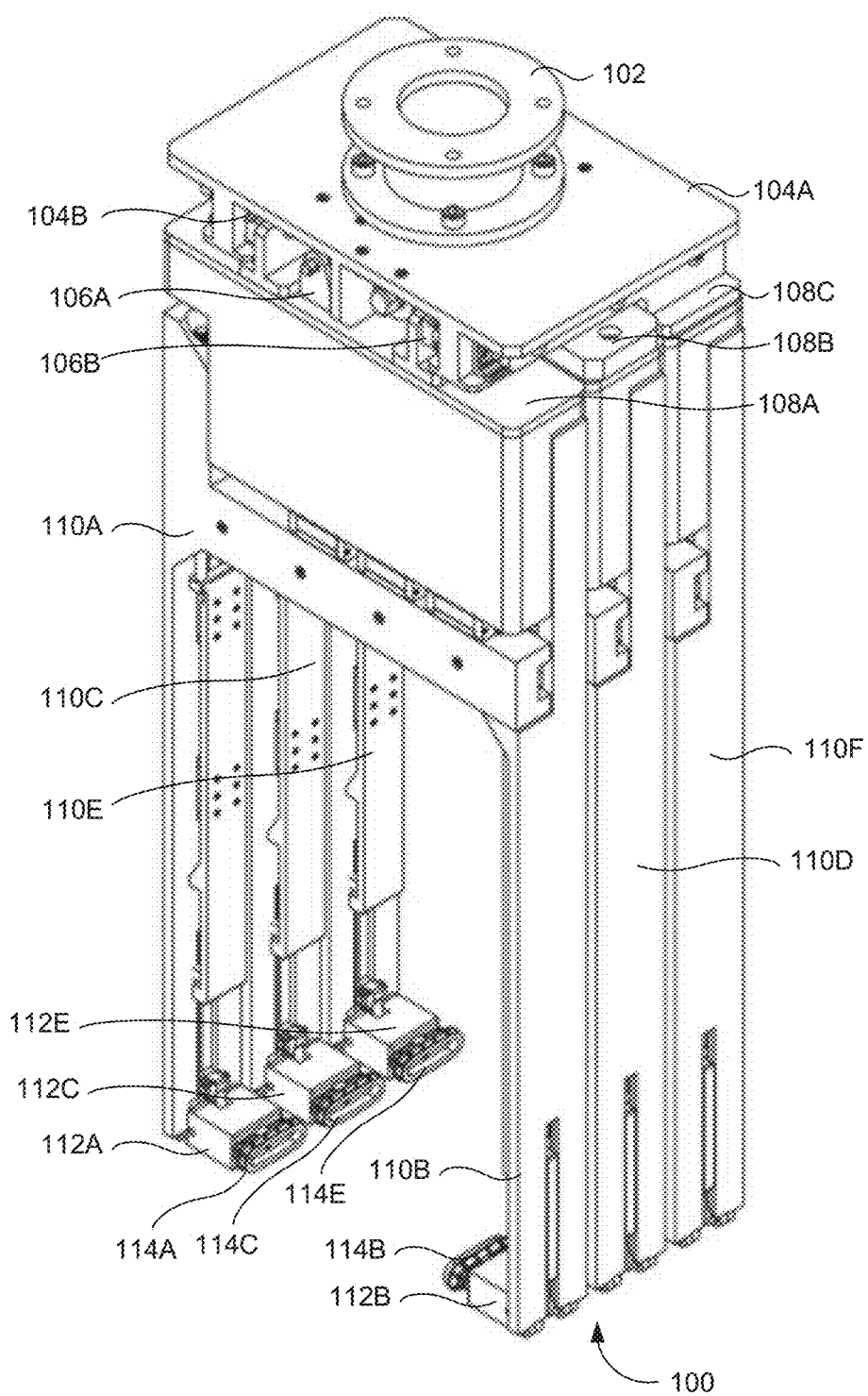
FIG. 1 illustrates a gripper apparatus for gripping at least one object, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIGS. 1 through 8, where similar reference characters denote corresponding features consistently throughout the figures, there are shown preferred embodiments and these embodiments are described in the context of the following exemplary system and/or method.

Reference numerals of one or more components of the gripper apparatus as depicted in the FIGS. 1 through 8 are provided in Table 1 below for ease of description:

TABLE 1

| SI. No | Component | Numeral reference |
|---|---|---|
| 1 | Gripper apparatus | 100 |
| 2 | Mounting adaptor | 102 |
| 3 | Inner surface of the mounting adaptor | 104A |
| 4 | Outer surface of the mounting adaptor | 104B |
| 5 | First actuator | 106A |
| 6 | Second actuator | 106B |
| 7 | Plurality of clamp supporting members | 108A-C |
| 8 | Plurality of grasping clamps 110A-F | 110A-F |
| 9 | Plurality of grasping fingers 112A-F | 112A-F |
| 10 | Plurality of suction cups 114A-F | 114A-F |
| 11 | Linear rail 402 | 402 |
| 12 | Force sensor array | 404 |
| 13 | Friction pad 406 | 406 |
| 14 | Pair of sliders | 408A-B |

FIG. 1 illustrates a gripper apparatus 100 for gripping at least one object, in accordance with an embodiment of the present disclosure. The gripper apparatus 100 may be referred as 'a gripper', 'a gripping device', 'an adaptive gripper' and the like and may be interchangeably used herein after. The expression 'at least one object' may be referred as 'object of interest' and interchangeably used hereinafter. The gripper apparatus 100 includes a mounting adaptor 102 (also referred as 'mounting adapter 102' and may be interchangeably used hereinafter) having an inner surface 104A and an outer surface 104B, a first actuator 106A and a second actuator 106B mounted on the inner surface 104A of the mounting adaptor 102 using a plurality of screws (or fixing mechanism), a plurality of clamp supporting members 108A-C, wherein each of the plurality of clamp supporting members is coupled to at least one of the first actuator 106A and the second actuator 106B respectively. In an embodiment, the 106A and the second actuator 106B are one of a hydraulic actuator or a pneumatic actuator. The gripper apparatus 100 further includes a plurality of grasping clamps 110A-F. A first set of grasping clamps 110A-B is coupled to a first clamp supporting member 108A of the plurality of clamp supporting members 108A-C. A second set of grasping clamps 110C-D is coupled to a second clamp supporting member 108B of the plurality of clamp supporting members 108A-C. A third set of grasping clamps 110E-F is coupled to a third clamp supporting member 108C of the plurality of clamp supporting members 108A-C. The above description can be better understood by way of following example. For instance, the first set of grasping clamps 110A-B, wherein the grasping clamp 110A (or a first end of the grasping clamp 110A) is connected to a first end (or first side) of the first clamp supporting member 108A and the grasping clamp 110B (or a first end of the grasping clamp 110B) is connected to a second end (or second side) of the first clamp supporting member 108A. Similarly, the second set of grasping clamps 110C-D, wherein the grasping clamp 110C (or a first end of the grasping clamp 110C) is connected to a first end (or first side) of the second clamp supporting member 108B and the grasping clamp 110D is connected to a second end (or second side) of the second clamp supporting member 108B. Similarly, the third set of grasping clamps 110E-F, wherein the grasping clamp 110E (or a first end of the grasping clamp 110E) is connected to a first end (or first side) of the third clamp supporting member 108C and the grasping clamp 110F (or a first end of the grasping clamp 110F) is connected to a second end (or second side) of the third clamp supporting member 108C. In other words, each grasping clamp from a specific set of grasping clamps is positioned opposite to one another. For instance, the grasping clamps 110A, 110C, and 110E are positioned opposite to the grasping clamps 110B, 110D, and 110F respectively.

Further, each of the plurality of clamp supporting members 108A-C comprises one or more actuators (not shown in FIGS.) wherein the one or more actuators are configured to actuate one or more corresponding grasping clamps. For instance, say actuator 'X' is configured to actuate say grasping clamps 110A-B. Similarly, say actuator 'Y' is configured to actuate say grasping clamps 110C-D. Similarly, say actuator 'Z' is configured to actuate say grasping clamps 110E-F. Alternatively, each of the grasping clamp may be actuated by a corresponding actuator. For instance, the grasping clamps 110A may be actuated by the actuator 'X1' and the grasping clamps 110B may be actuated by the actuator 'X2'. Similarly, the grasping clamps 110C may be actuated by the actuator 'Y1' and the grasping clamps 110D may be actuated by the actuator 'Y2'. Similarly, the grasping clamps 110E may be actuated by the actuator 'Z1' and the grasping clamps 110F may be actuated by the actuator 'Z2'. In such scenarios, the each of the plurality of clamp supporting members 108A-C may house at least two actuators. The actuators X, Y, Z or X1, X2, Y1, Y2, Z1, and Z2 as discussed above by way of examples, are one of a hydraulic actuator or a pneumatic actuator, in an example embodiment of the present disclosure.

Each of the plurality of grasping clamps 110A-F (also referred as 110A-N) comprises at least one corresponding grasping finger. For instance, the grasping clamp 108A comprises a corresponding grasping finger 112A connected to a second end of the grasping clamp 108A, wherein the first end of the grasping clamp 110A is connected to the first end/first side of the first grasping supporting member 108A. Similarly, the grasping clamp 108B comprises a corresponding grasping finger 112B connected to a second end of the grasping clamp 108B, wherein the first end of the grasping clamp 110B is connected to the second end/second side of the first grasping supporting member 108A. The grasping clamp 108C comprises a corresponding grasping finger 112C connected to a second end of the grasping clamp 108C, wherein the first end of the grasping clamp 110C is connected to the second end/second side of the second grasping supporting member 108B. Similarly, the grasping clamp 108D-F comprises a corresponding grasping finger 112D, 112E and 112F respectively and the arrangement or connections are depicted in FIG. 1. In the present disclosure, the grasping fingers 112A-F collectively could be referred as a grasping finger 112. In an embodiment of the present disclosure, the at least one grasping finger (also referred as 112) is a variable angle controlling finger. Further, each of the grasping fingers 112A-F includes at least one suction cup (or also referred as 'suction bellow' and interchangeably used herein after) at the end of each grasping finger. In one embodiment, there could be multiple suction cup arrangement at end of each grasping finger. In an embodiment, the end of each grasping finger may be referred as fingertip or grasping fingertip. In FIG. 1, at least 6 suction cups 114A-F are depicted (also collectively may be referred as 114). Suction cups 114D and 114F are not seen in FIG. 1 due the nature of view of FIG. 1, however it is to be understood by a person having ordinary skill in the art or person skilled in the art that suction cups 114D and 114F are positioned at end of grasping finger 112D and 112F respectively (which are again not depicted in FIG. 1 due the nature of view of FIG. 1).

Figure 2:
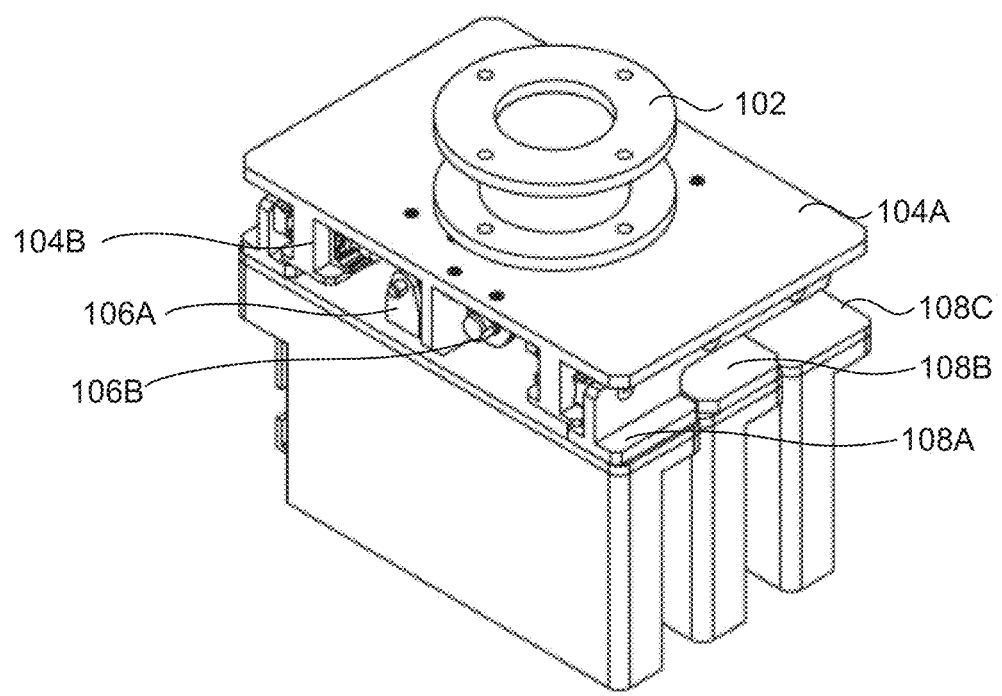
FIG. 2 depicts a top assembly of the gripper apparatus of FIG. 1, in accordance with an embodiment of the present disclosure

FIG. 2, with reference to FIG. 1, depicts a top assembly of the gripper apparatus 100 of FIG. 1, in accordance with an embodiment of the present disclosure. More specifically, FIG. 2 depicts the top assembly with the mounting adaptor 102 having the inner and outer surfaces 104A and 104B respectively. The top assembly further depicts the first actuator and the second actuator 106A and 1066 respectively. As can be from FIG. 2, the first actuator 106A and the second actuator 106B are fixed to the inner surface 104A of the mounting adaptor 102 via screw mechanism (e.g., using one or more screws). The screwing mechanism is depicted by way of black holes on the outer surface 1046 of the mounting adaptor that enable mounting of the first actuator and the second actuator 106A and 106B to the inner surface 104A. The top assembly also depicts the three clamp supporting members 108A-C.

Figure 3:
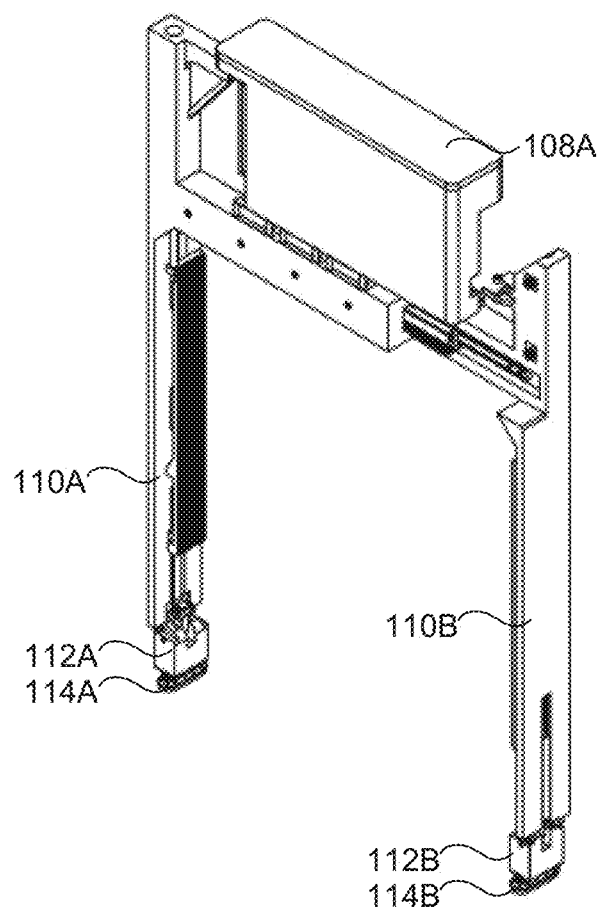
FIG. 3 depicts a gripper clamp-finger assembly of the gripper apparatus of FIG. 1, in accordance with an embodiment of the present disclosure

FIG. 3, with reference to FIGS. 1 through 2, depicts a gripper clamp-finger assembly of the gripper apparatus 100 of FIG. 1, in accordance with an embodiment of the present disclosure. More specifically, FIG. 3 depicts a clamp supporting member (e.g., the clamp supporting member 108A), wherein the clamp supporting member 108A accommodate the one or more actuators. Further, the each of the plurality of grasping clamps is of a T-shape clamp. In an alternative embodiment, the present disclosure may utilize two or more joining components (or joints) that together form a T-shape grasping clamp as depicted in FIGS of the present disclosure.

Figure 4:
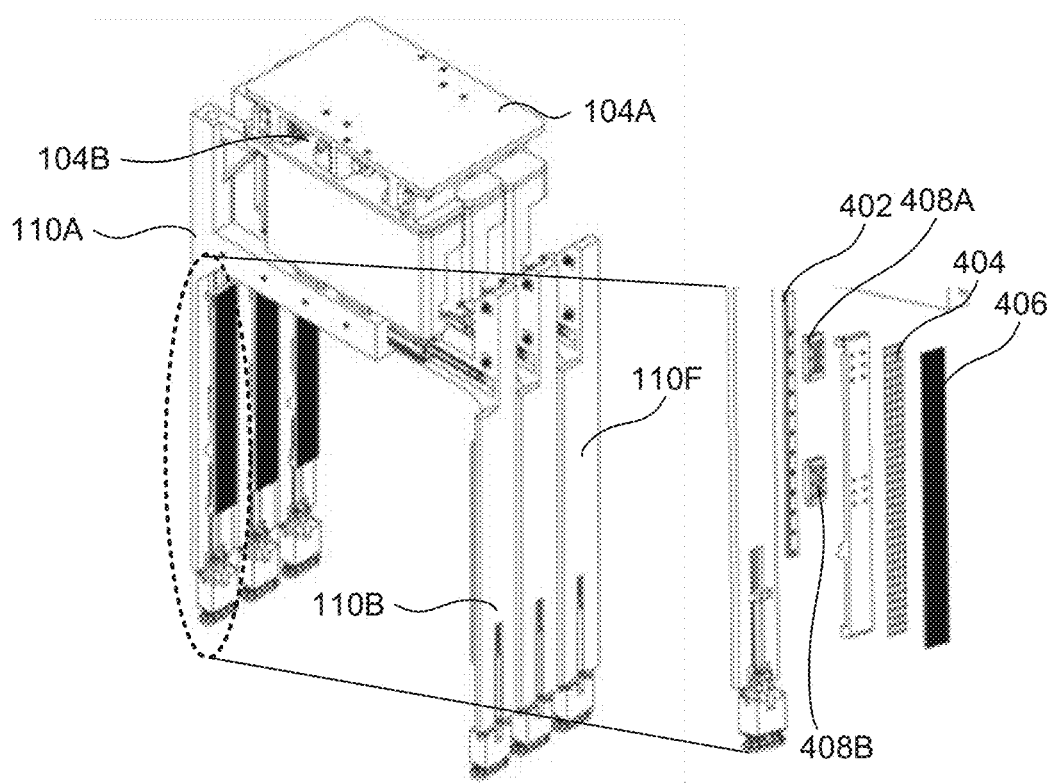
FIG. 4 depicts a friction pad assembly comprised in a plurality of grasping clamps of the gripper apparatus of FIG. 1, in accordance with an embodiment of the present disclosure

FIG. 4, with reference to FIGS. 1 through 3, depicts a friction pad assembly comprised in each of the plurality of grasping clamps of the gripper apparatus 100 of FIG. 1, in accordance with an embodiment of the present disclosure. More specifically, FIG. 4 depicts a sliding friction pad attached to a corresponding inner surface of each of the plurality of grasping clamps 108A-F. For instance, as can be depicted in FIG. 4, the friction pad assembly 112A F comprises a linear rail 402, a force sensor array 404, a friction pad 406, and a pair of sliders 408A-B. The force sensor array may also be referred as a sensor array and interchangeably used hereinafter. The force sensor array is positioned between (i) each grasping clamp of the plurality of grasping clamps and (ii) the friction pad (also referred as 'sliding friction pad' and may be interchangeably used hereinafter.

The gripper apparatus 100 can be used for manipulation of wide range of objects. It can be used in two modes, parallel grasping and pneumatic vacuum grasping as shown in FIGS. 5 and 6 respectively. Type of grasping depends on certain parameters such as shape, size, packaging of the object. One or more vision sensors comprise a 2D sensor, a 3D sensor or a combination of 2D and 3D sensors (3D+2D) are integrated with the gripper apparatus 100 which captures the size, shape, location, orientation and type of packaging of the parcels. In the present disclosure, the one or more vision sensors are not visible and not depicted in the FIGS. The vision sensors may also be referred as an image capturing device or the electronic device as described above and may further be interchangeably used hereinafter. In an embodiment of the present disclosure, the vision sensor is an electronic device that captures information of at least one object to be grasped. The captured information comprises size, shape, surface, and an orientation of the at least one object and the like. Further, the gripper apparatus is backed by artificial intelligence system (e.g., one or more hardware processors 704) which decides the type of grasping to be used, dimension of the object and other critical parameters with this information. In the present disclosure, (i) one or more grasping points, and (ii) an amount of collapsing and expansion of the plurality of grasping clamps are estimated based on the captured information. More specifically this estimation may be performed by the one or more hardware processors.

Figure 5A:
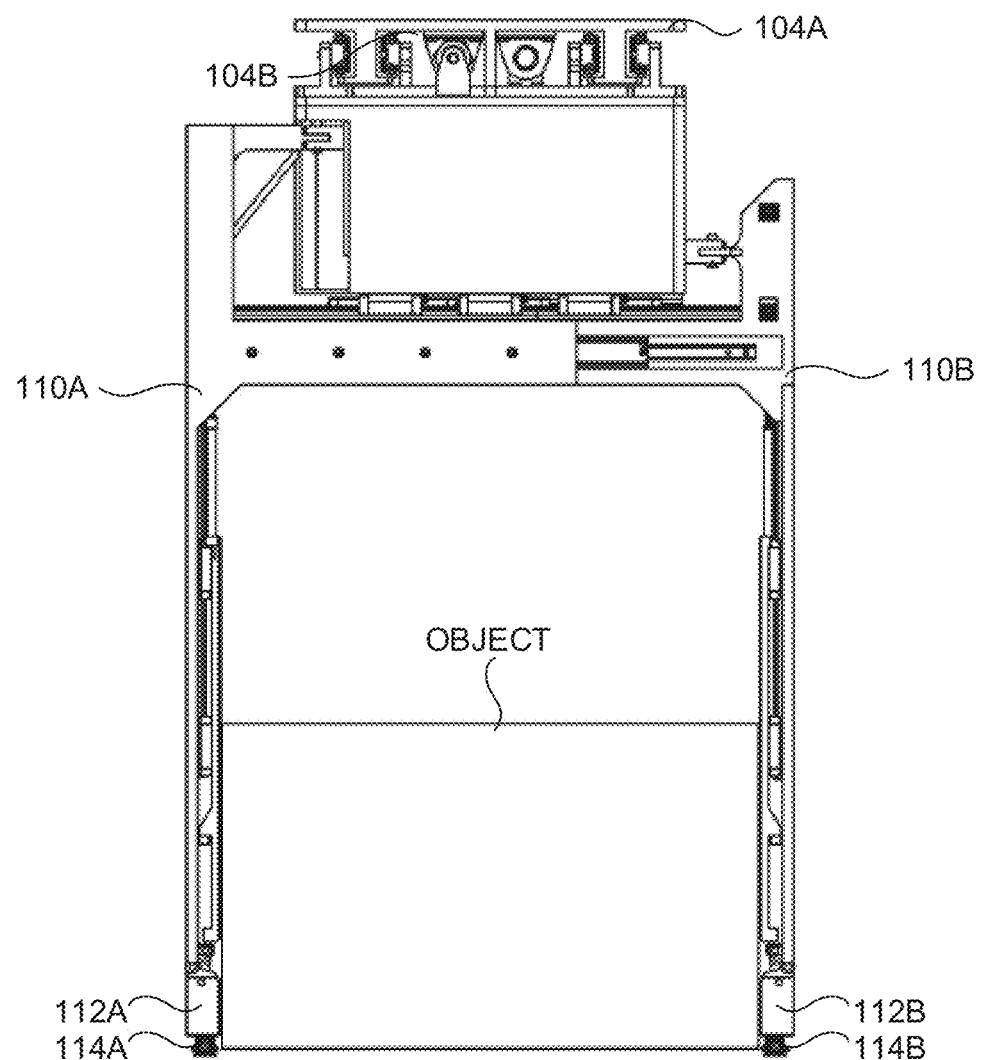
FIG. 5A through 5D depict a series of steps carried out by the gripper apparatus of FIG. 1 for grasping the at least one object using a parallel grasping mechanism, in accordance with an embodiment of the present disclosure.
Figure 5B:
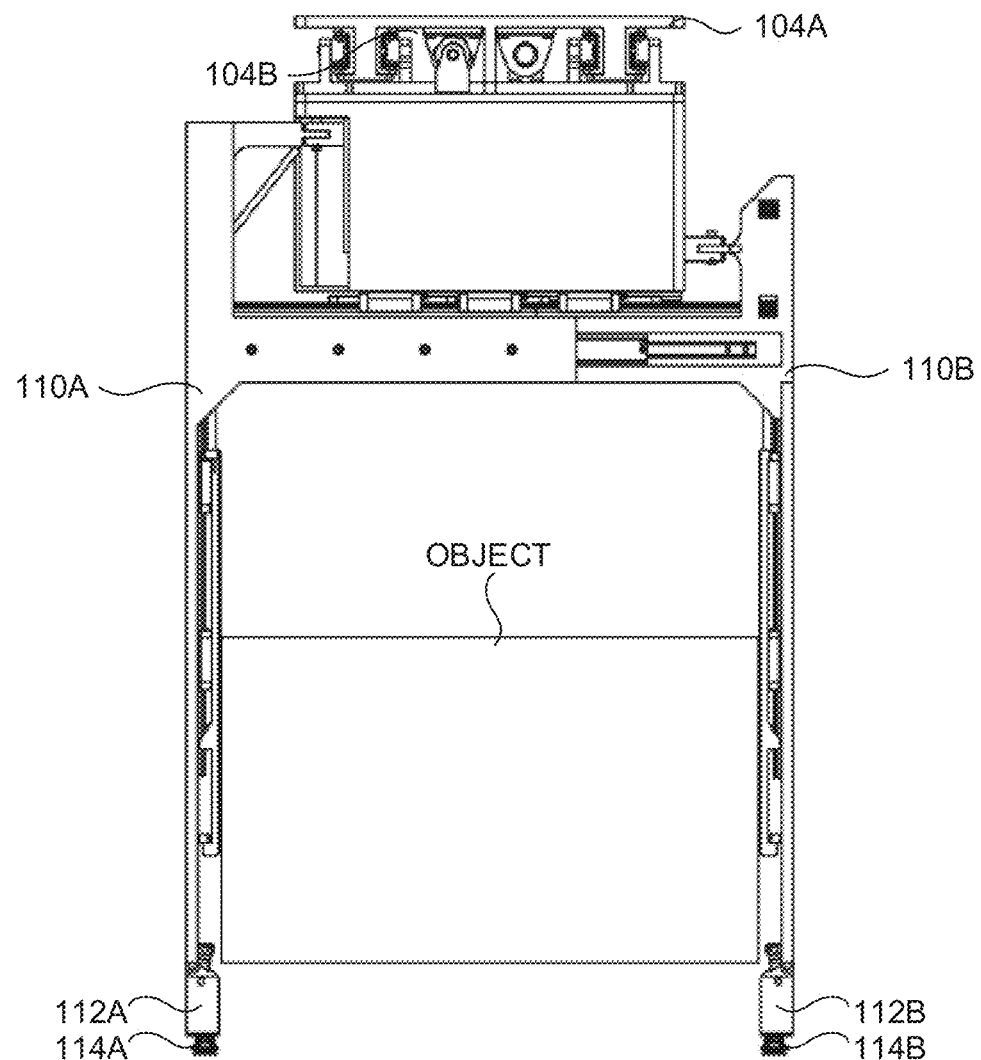
Figure 5C:
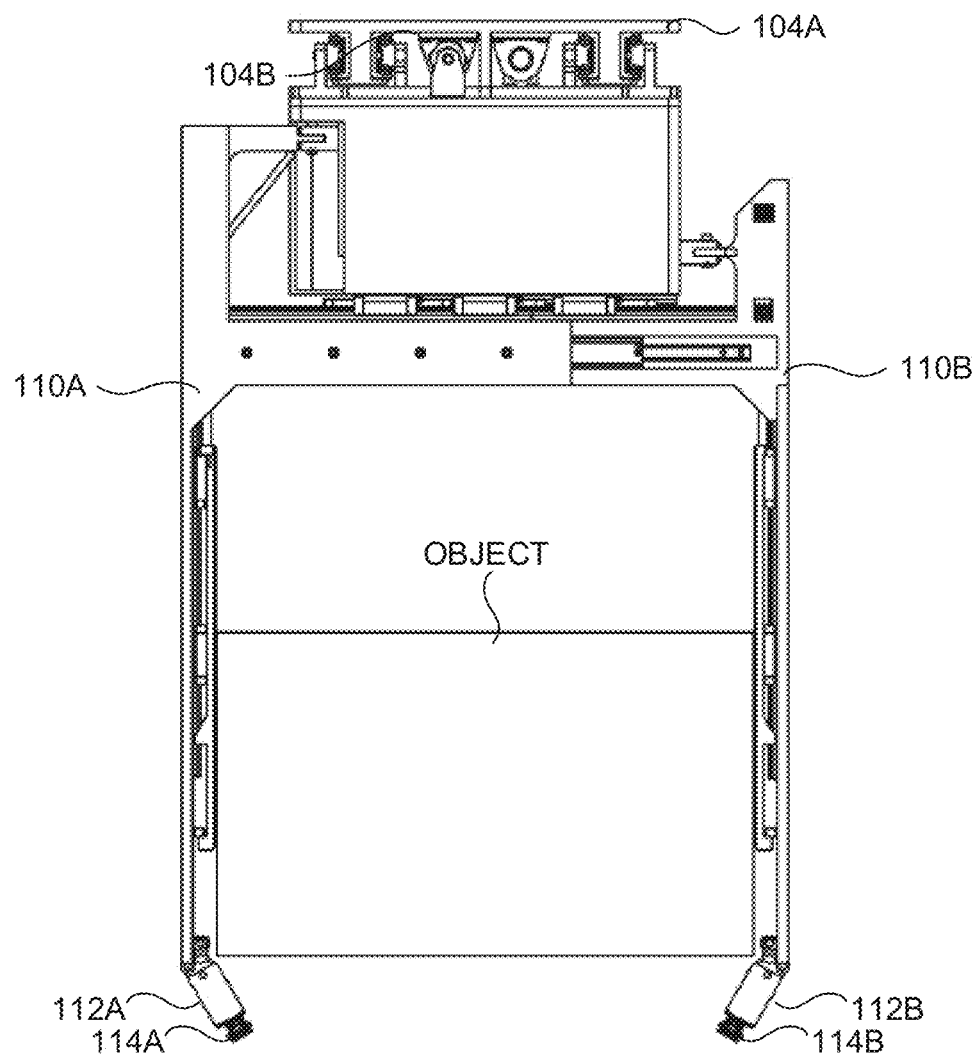
Figure 5D:
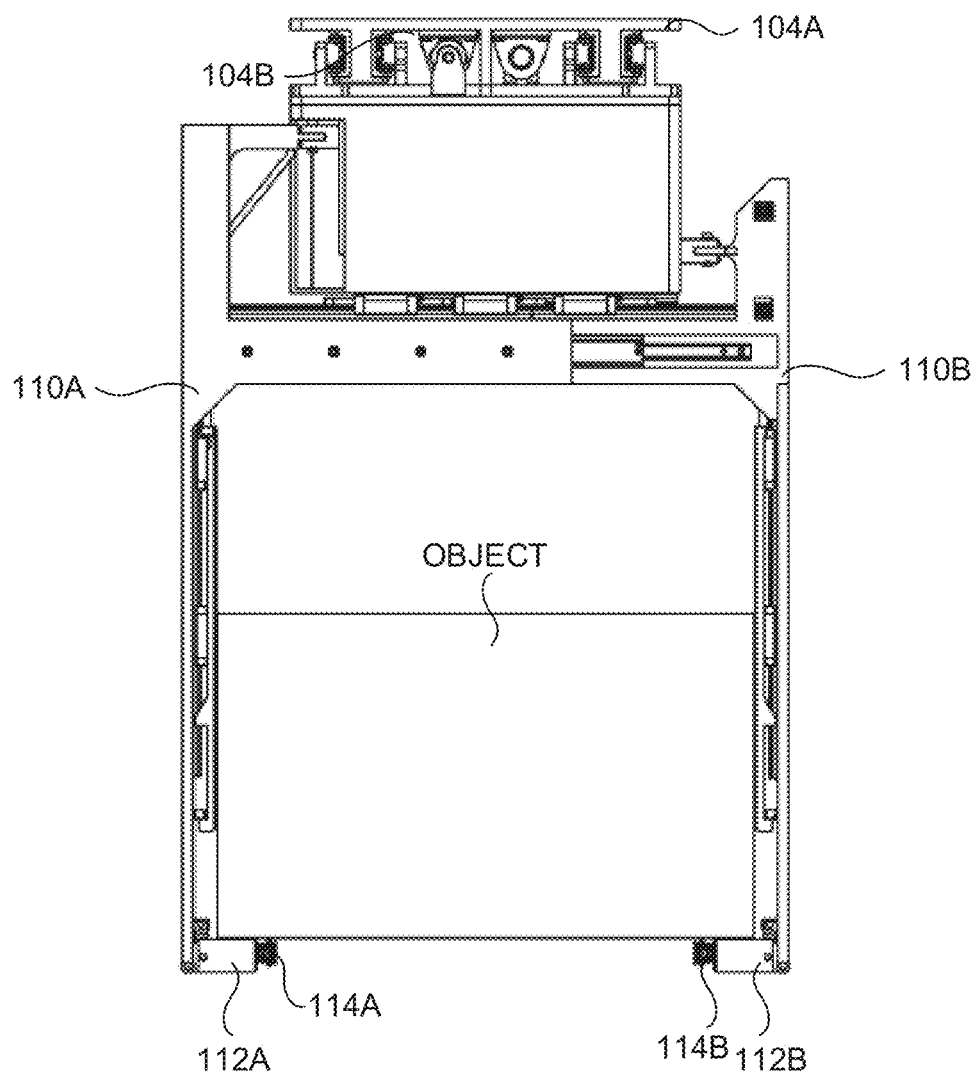
Figure 5E:
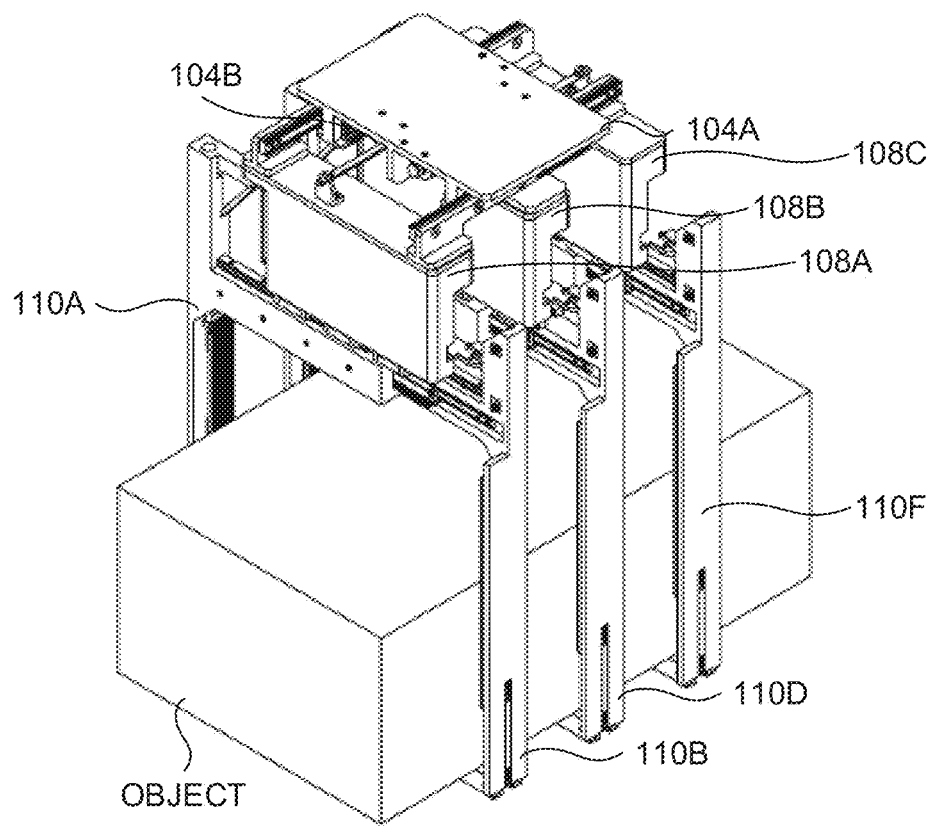
FIG. 5E depicts the gripper apparatus of FIG. 1 that grasps the at least one object using the parallel grasping mechanism, in accordance with an embodiment of the present disclosure.
Figure 5F:
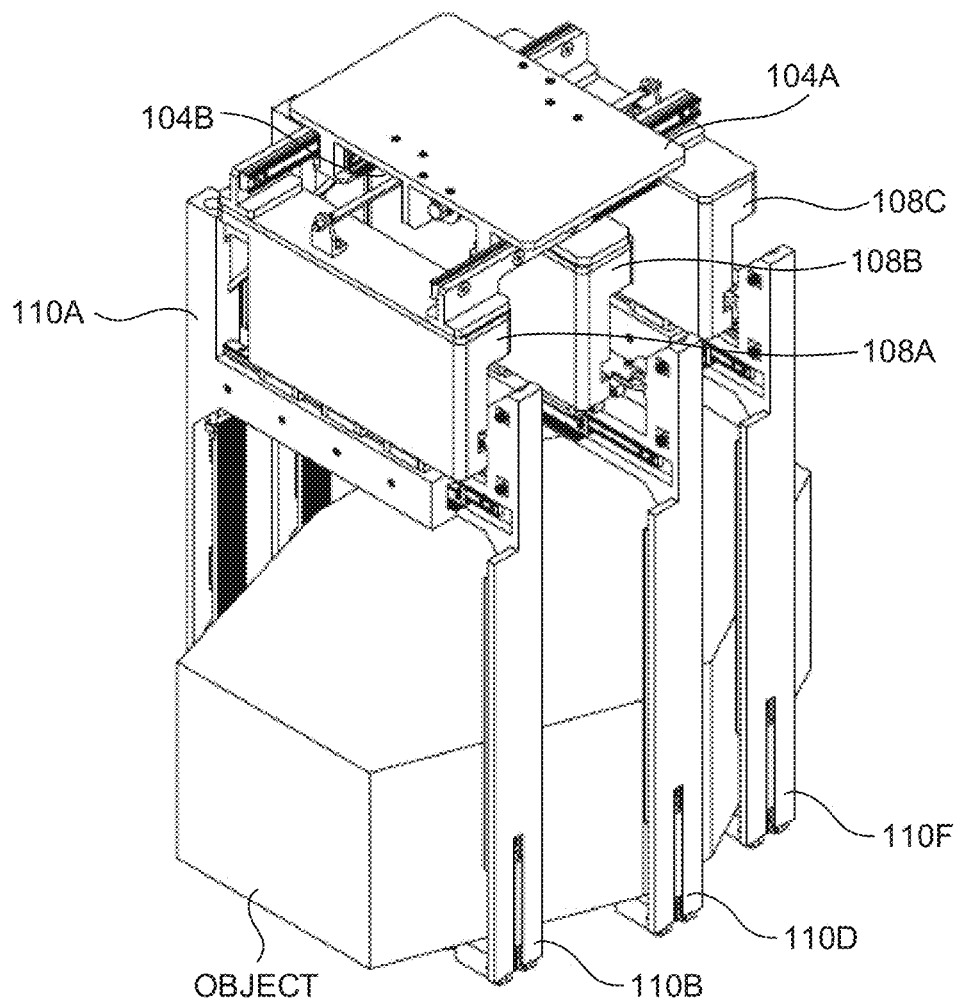
FIG. 5F depicts the gripper apparatus of FIG. 1 that grasps at least one object of a different size and shape as compared to the at least one object depicted in FIG. 5E, using the parallel grasping mechanism, in accordance with an embodiment of the present disclosure.
Figure 6:
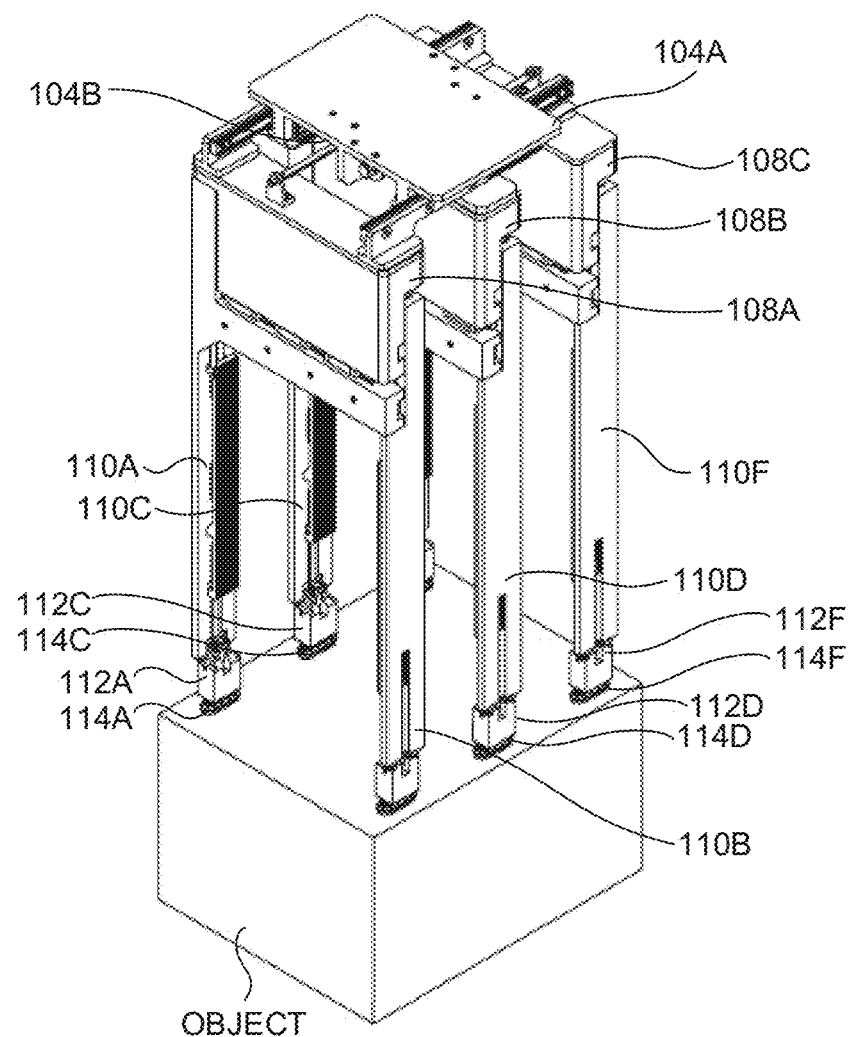
FIG. 6 depicts the gripper apparatus of FIG. 1 that grasps the at least one object using a pneumatic grasping mechanism, in accordance with an embodiment of the present disclosure.

FIG. 5A through 5D, with reference to FIGS. 1 through 4, depict a series of steps carried out by the gripper apparatus 100 of FIG. 1 for grasping the at least one object using a parallel grasping mechanism, in accordance with an embodiment of the present disclosure. As mentioned, based on the determined center of gravity, the at least one grasping finger 112 is configured for at least one of expansion or collapse to change an associated initial position to another position to firmly grasp the at least one object, or the suction cup is triggered to firmly grasp the at least one object based on the captured information. The various operating positions of the grasping finger 112A-F during the grasping of object of interest are depicted in various FIGS. 5A through 5D. Further the actuators 106A-B enable movement (e.g., direction such as up/down, front/rear/back, sideways, diagonally up/down, diagonally front/rear/back and the like) and change of state(s) (e.g., open, close, expand, collapse, and the like) of the grasping supporting members 108A-C which directly or indirectly enable movement (e.g., direction such as up/down, front/rear/back, sideways, diagonally up/down, diagonally front/rear/back and the like) and change in states (e.g., open, close, expand, collapse, and the like) of the plurality of grasping clamps 110A-F and the grasping finger 112A-F respectively. In other words, the grasping fingers 112A-F open and close (or expand and/or collapse) depending upon the grasping area of the object of interest, wherein the object of interest moves upwards such that the grasping fingers 112A-F attain a closing position at the bottom of the object to hold onto the object firmly. During attaining of the closing position of the grasping fingers 112A-F, the grasping fingers 112A-F may expand or collapse and form various states (open, close, and the like), in one example embodiment of the present disclosure. For instance, FIGS. 5A and 5B depict an initial position of the grasping fingers 112A-F, FIG. 5C on the other hand depicts a change in the initial position as the object has moved upwards thus making enough room/space for the grasping fingers 112A-F to attain a closing position to hold onto the object (e.g., a box) firmly as depicted in FIG. 5D. FIG. 5E, with reference to FIGS. 1 through 5D, depicts the gripper apparatus 100 of FIG. 1 that grasps the at least one object using the parallel grasping mechanism, in accordance with an embodiment of the present disclosure. FIG. 5F, with reference to FIGS. 1 through 5E, depicts the gripper apparatus 100 of FIG. 1 that grasps at least one object of a different size and shape as compared to the at least one object depicted in FIG. 5E, using the parallel grasping mechanism, in accordance with an embodiment of the present disclosure.

FIG. 6, with reference to FIGS. 1 through 5F, depicts the gripper apparatus 100 of FIG. 1 that grasps the at least one object using a pneumatic grasping mechanism, in accordance with an embodiment of the present disclosure. The grasping of the at least one object will be explained for FIGS. 5A through 5E and 6, with reference to FIGS. 1 through 4. Considering an object to be grasped. During grasping of the at least one object in real time, the plurality of clamp supporting members 108A-C are actuated by at least one of the first actuator 106A and the second actuator 106B for movement in at least one direction based on the estimated one or more grasping points. The first actuator 106A and the second actuator 1066 are actuated until a force sensor feedback is obtained from the at least one grasping finger coupled at each of the plurality of grasping clamps.

This further triggers/actuates each of the plurality of grasping clamps 110A-F for expansion or collapsing based on (i) the movement of the plurality of clamp supporting members 108A-C in real-time and (ii) the estimated amount of collapsing and expansion of the plurality of grasping clamps. For instance, depending upon the captured information by the vision sensors (or the electronic device), the hardware processors estimate the one or more grasping points, and the amount of collapsing and expansion of the plurality of grasping clamps. As can be seen in FIG. 5, the object type is a rectangle box. In such scenarios, the plurality of clamp supporting members 108A-C are actuated by the first actuator 106A and/or the second actuator 1066 for movement in at least one direction. Similarly, based on the movement of the plurality of clamp supporting members 108A-C, each of the plurality of grasping clamps expands or collapses based on the amount collapsing and expansion being determined by the hardware processors. Alternatively, each pair of grasping clamp can also expand and collapse individually. Certain packaging/objects do not permit the use of pneumatic suction/pneumatic grasping method for grasping as packaging can be weak, damaged or loose, which can tear while grasping. Some corrugated boxes are also not easy to handle with the suction method with heavy load, and even heavy items with well packaging requires extra accessories. In such scenario parallel grasping method is most suitable. Artificial intelligence system of the gripper apparatus 100 itself decides suitability of the grasping method and it can adjust the gripper clamps according to shape, size and other parameters of the items/object which are recorded by the various sensors (e.g., the sensor array) and analysed by a controller (e.g., the one or more hardware processors).

During grasping of the at least one object, the sliding friction pad is actuated to slide from one position to another position until center of gravity is determined, based on sensory information received from the at least one sensor array pertaining to force applied on the at least one object. In other words, the gripper apparatus 100 includes slipping sensor and force sensor array on the friction pad which assists in parallel grasping. The force sensor equipped with friction pad senses the pressure while grasping and determines slipping which helps the gripper apparatus 100 determine adequate force to apply for proper handling of the fragile or slippery objects. Based on the determined center of gravity, the at least one grasping finger is configured for at least one of expansion or collapse to change an associated initial position to another position to firmly grasp the at least one object. The suction cup is triggered/actuated to firmly grasp the at least one object based on the captured information. FIG. 6, with reference to FIGS. 1 through 5, depicts grasping of the at least one object using the pneumatic grasping mechanism where the gripper apparatus 100 employs the suction cup to grasp the at least one object. Therefore, the at least one object is displaced from an initial position to a desired position using a linear slider mechanism of the at least one grasping finger coupled at each of the plurality of grasping clamps. The linear slider mechanism is depicted in FIG. 4 by employing the slider 408 (also referred as linear slider mechanism).

The gripper apparatus 100 which could be attached to robot, can also handle multi-dimensional objects as individual clamp expanding distance can be controlled independently. The part/object area can be scanned via the sensor array for shape and size information. Based on information, the gripper apparatus 100 utilizes an artificial intelligence-based hardware processor that decides which grasping method is best fit to the given task. The vision sensor/sensor array can segment the image of the at least one object for identifying an outer parameter of the object and the gripper apparatus 100 arranges the grasping finger's position such that it can optimize the weight distribution for parallel grasping.

If the gripper apparatus 100 is grasping using parallel grasping, force sensor array gives the information of contact force and slipping parameters. In other words, the first actuator 106A and the second actuator 106B are actuated to obtain the force sensor feedback. The force sensor feedback comprises information specific to contact force and one or more slipping parameters (e.g., wherein the slipping parameters comprise amount and level grip required and estimated during grasping, whether the current gripping is less and more friction is required, whether the current gripping is more and less friction is required, or whether current gripping is sufficient to firmly grasp the object and the like) associated with grasping of the at least one object in real time. The individual grasping extension (or the grasping clamp) can contract to the length such that the object stops slipping between the object and finger friction pad. In case of deformable bags force sensors measures the contact force and squeeze to the point it stops slippage between the bag and its friction pads. This level of continuous force sensor feedback such as amount and level grip required and estimated during grasping, whether the current gripping is less and more friction is required, whether the current gripping is more and less friction is required, or whether current gripping is sufficient to firmly grasp the object and the like enables the gripper apparatus 100 to engage the object in more efficient manner and grasp the object more firmly and securely without spilling the object and prevent from inadvertent release of the object of interest. In other words, the gripper apparatus 100 may utilize amount and level grip required and estimated during grasping, whether the current gripping is less and more friction is required, whether the current gripping is more and less friction is required, or whether current gripping is sufficient to firmly grasp the object and the like during grasping of the grasping of object of interest using the pneumatic grasping mechanism. Though obtaining the force sensor feedback is described in view of the parallel grasping mechanism, the gripper apparatus 100 obtain (or may obtain) the information related to force sensor feedback comprising contact force and one or more slipping parameters for grasping object of interest using the pneumatic grasping mechanism. In other words, the gripper apparatus 100 may utilize amount and level grip required and estimated during grasping, whether the current gripping is less and more friction is required, whether the current gripping is more and less friction is required, or whether current gripping is sufficient to firmly grasp the object and the like during grasping of the grasping of object of interest using the pneumatic grasping mechanism.

The gripper apparatus 100 combines the method of force closure and form closure for parallel grasping which gives the stable manipulation of the items using parallel grasping. Thickness of individual extension is only few centimeters, which leaves very small space between the object to object while arranging the items in a container. While picking and placing, the gripper apparatus 100 has no protruding part which makes it suitable for going into very confined space. Friction pad makes it suitable for picking objects from a same space without requiring any extra space. The above description on parallel grasping mechanism can be better understood by way of following explanation:

Parallel Grasping Mechanism:

Each pair of parallel grasping clamp are actuated by individual linear actuator and these linear actuators can be controlled independently (via way of providing power supply). Each of the linear actuators may be comprised in at least one corresponding grasping clamp. For instance, a linear actuator may be comprised in grasping clamp 110A to actuate and control an associated friction pad of the grasping clamp 110A. Alternatively, one linear actuator may be comprised in at least one grasping clamp to actuate and control a friction pad comprised in each of the grasping clamps 110A-B. It is to be understood by a person having ordinary skill in the art or person skilled in the art that similar arrangement can be expected or realized for other grasping clamp and actuation and control of an associated friction pad in other the grasping clamps 110C-F. FIG. 5 shows the different component of a pair of clamps. Each pair has one right side clamp and one at the left side, and each clamp is controlled by a linear actuator. A telescopic linear slider (also referred as 'slider 408') supports both the clamps and constraints the motion. Sliding friction pad(s) (also referred as friction pad and may be interchangeably used hereinafter) are mounted on each clamp, these friction pads can move up and down on a linear slider as depicted in FIG. 4. The position of these friction pads is actuated by a linear actuator (not shown in FIGS). Slipping sensor are used to ensure no slipping between the object surface and friction pads wherein data/information from the force sensor and slipping sensor are processed and the object to be grasped is categorized as deformable and non-deformable object. Force is applied within the permissible limit until the slipping stops. Once the gripper apparatus 100 ensures the grasping without slipping, linear actuator is used to lift the object to a certain height. Link(s) (not shown in FIGS.) is/are used at the bottom to provide support from the bottom while manipulation. Link is designed such that it does not actuate lower finger top until the friction pad lifts the object to a certain height. Beyond certain height the link is pulled up and lower fingertip is actuated. The gripper apparatus 100 can expand laterally and longitudinally, and the compact structure of this gripper apparatus 100 gives it the advantage to pick and place an object from narrow clearance space.

Pneumatic Grasping Mechanism:

The gripper apparatus 100 is equipped with pneumatic suction bellows (also referred as suction cups) at the end of the fingertip which can be used for fast manipulation of lightweight well-packed items. Like parallel grasping mechanism, space arrangement of the gripper's suction bellows position is optimized according to the object's shape and size (e.g., refer FIG. 6).

Figure 7:
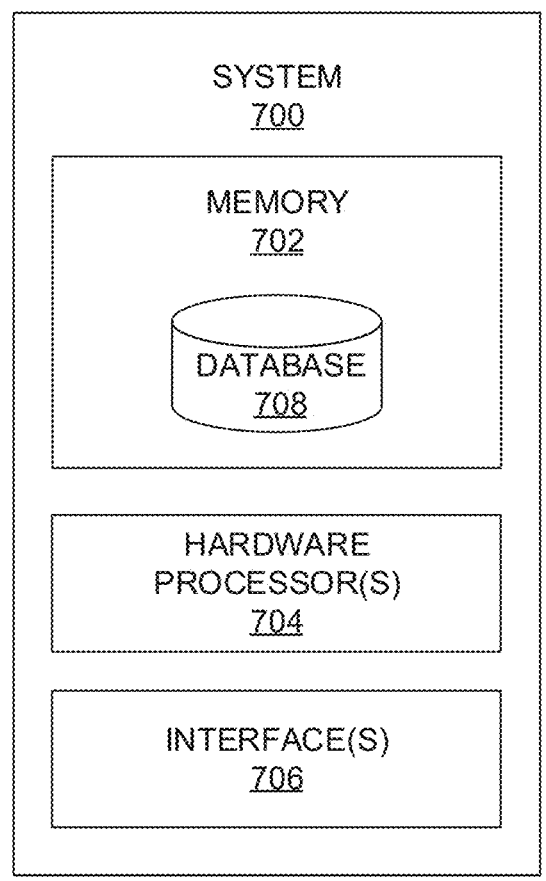
FIG. 7 depicts a system for capturing information and estimating grasping points and amount of expansion and collapse of the plurality of grasping clamps of the gripper apparatus of FIG. 1, in accordance with an embodiment of the present disclosure.

FIG. 7, with reference to FIGS. 1 through 6, depicts a system 700 for capturing information and estimating grasping points and amount of expansion and collapse of the plurality of grasping clamps of the gripper apparatus 100 of FIG. 1, in accordance with an embodiment of the present disclosure.

In an embodiment, the system 700 includes one or more hardware processors 704, communication interface device(s) or input/output (I/O) interface(s) 706 (also referred as interface(s)), and one or more data storage devices or memory 702 operatively coupled to the one or more hardware processors 704. The one or more processors 704 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 700 can be implemented in a variety of computing systems, such as laptop computers, notebooks, hand-held devices, workstations, mainframe computers, servers, a network cloud, robot, and the like.

The I/O interface device(s) 706 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 702 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 708 is comprised in the memory 702, wherein the database 708 comprises information, for example, object shape, object size, object orientation, object type (e.g., deformable or non-deformable) and the like. The information stored in the database 708 may further comprise grasping points estimated by the gripper apparatus 100 or the hardware processors 704. The information stored in the database 708 may further comprise amount of expansion and collapsing of the clamp supporting members and the plurality of grasping clamps. The information stored in the database 708 may further comprise how much amount of the grasping fingers should bend during grasping of the object, how much amount of suction should be provided into the suction cups for grasping the object, and the like. The memory 702 further comprises (or may further comprise) information pertaining to input(s)/output(s) of each step performed by the systems and methods of the present disclosure. In other words, input(s) fed at each step and output(s) generated at each step are comprised in the memory 702 and can be utilized in further processing and analysis.

Figure 8:
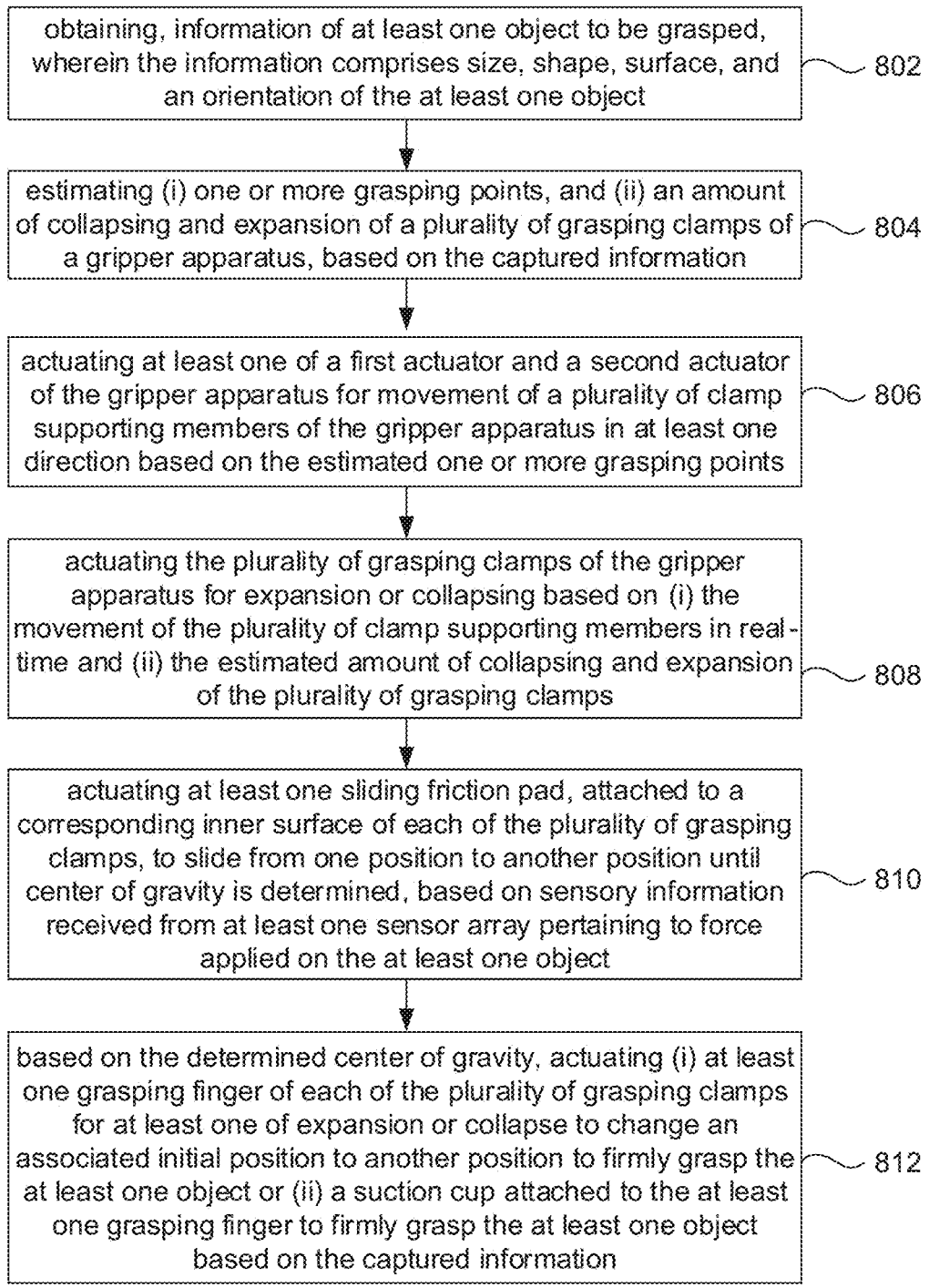
FIG. 8 depicts an exemplary flow chart illustrating a method for grasping at least one object using the gripper apparatus of FIG. 1, in accordance with an embodiment of the present disclosure.

FIG. 8, with reference to FIGS. 1 through 7, depicts an exemplary flow chart illustrating a method for grasping at least one object using the gripper apparatus 100 of FIG. 1, in accordance with an embodiment of the present disclosure. The steps of the method of the present disclosure will now be explained with reference to components of the system 700 of FIG. 7, FIGS. 1 through 6, and the flow diagram as depicted in FIG. 8. In an embodiment, at step 802 of the present disclosure, information of at least one object to be grasped is obtained, wherein the information comprises size, shape, surface, and an orientation of the at least one object. In an embodiment, at step 804 of the present disclosure, (i) one or more grasping points, and (ii) an amount of collapsing and expansion of the plurality of grasping clamps 110A-F are estimated based on the captured information. In an embodiment, at step 806 of the present disclosure, at least one of the first actuator 106A and the second actuator 1066 of the gripper apparatus 100 is actuated for movement of a plurality of clamp supporting members 108A-C of the gripper apparatus 100 in at least one direction based on the estimated one or more grasping points. In an embodiment, at step 808 of the present disclosure, the plurality of grasping clamps 110A-F of the gripper apparatus 100 are actuated for expansion or collapsing based on (i) the movement of the plurality of clamp supporting members 108A-C in real-time and (ii) the estimated amount of collapsing and expansion of the plurality of grasping clamps 110A-F. In an embodiment, at step 810 of the present disclosure, the at least one sliding friction pad 406 which attached to a corresponding inner surface of each of the plurality of grasping clamps 110A-F is actuated to slide from one position to another position until center of gravity is determined, based on sensory information received from at least one sensor array 404 pertaining to force applied on the at least one object. In an embodiment, at step 812 of the present disclosure, based on the determined center of gravity, the gripper apparatus 100 with the help of system 700 actuates (i) at least one grasping finger 112A-F of each of the plurality of grasping clamps 110A-F for at least one of expansion or collapse to change an associated initial position to another position to firmly grasp the at least one object or (ii) a suction cup 114A-F attached to the at least one grasping finger 112A-F to firmly grasp the at least one object based on the captured information.

Object manipulation in warehouses and logistics facilities is a challenging task because of the unstructured environment. The unstructured environment can have items/objects with different form factors, weight, shape, and size. Traditionally, multiple robots have been used to handle for specific task to be performed by an individual robot which requires high floor. This leads to higher cost and infrastructure. Embodiments of the present disclosure provide a gripper apparatus that addresses a single gripper design handling multiple parcels, wherein the apparatus consists of 'm' fingers parallel to each other and can be independently controlled through actuators, each finger has a force sensors feedback and also actuators which are controlled with force. Each finger comprises a linear slider for actuation for gripping objects and wherein bottom fingers are moved to provide enough gravity support.

Further, apparatus comprises bellows attached to each finger end for grasping object using pneumatic grasping mechanism which cannot be picked through the parallel fingers as can be seen from FIGS. (refer parallel grasping mechanism). The apparatus 100 may be further equipped with a 2D and/or 3D camera (also referred as an electronic device) which provides complete shape of the object/parcel and this input is given to the gripper apparatus 100, wherein the gripper apparatus 100 identifies the actual normal at which the object has to be picked and the collapsible/expandable fingers opens such a way that it moves between the object/parcel and one or more gripper actuators are actuated until it gets force feedback from the fingers. Once the object/parcel is gripped, it is lifted using linear slider for the fingers to close and support the gravity support.

The gripper apparatus 100 is connected to a robot or an external system via one or more coupling systems (e.g., connectors as known in the art) or input/output interfaces as known in the art. The external system or the robot comprises (or may comprise) the components as shown in FIG. 7, wherein the robot or external system receives information being captured by the electronic device. In an embodiment, the electronic device may be comprised in the external system or the robot. In another embodiment, the system 700 may be comprised in the gripper apparatus 100. The same information is processed by the one or more hardware processors 704 which estimate movement of a plurality of clamp supporting members in at least one direction based on the estimated one or more grasping points. The same information is processed by the one or more hardware processors that estimate one or more grasping points, and an amount of collapsing and expansion of the plurality of grasping clamps, based on the captured information. The robot or external system may be connected to the gripper apparatus 100 (e.g., the robot or external system may be connected to the mounting adaptor 102) and wherein the robot or external system may be operated in such a way that the gripper apparatus is monitored/controlled to grasp object of interest firmly with the help of continuous force sensor feedback received in real-time and until center of gravity is determined and/or attained by the gripper apparatus 100. In an embodiment, the system 100 may be comprised within (or integrated inside) the gripper apparatus 100. In another embodiment, the system 100 may be externally connected to the gripper apparatus via one or more interfaces/coupling mechanism/connectivity means, etc. Moreover, unlike conventional grippers, wherein these conventional grippers fail to attempt and address handling only one parcel/object type at a time (wherein objects differ in various types and shapes and size) in various environments (e.g., constrained and/or controlled environments), the gripper apparatus 100 of the present disclosure is compact in design and overcomes the complex mechanism and is configured to handle wide varieties of objects/parcels at a single time and is agnostic to (or irrespective of) the environment type. For instance, if an object/parcel is placed above another object, based on the captured information, (i) grasping points, (ii) amount of collapsing and expansion of (a) the grasping supporting members and/or (b) the plurality of grasping clamps are estimated for movement until center of gravity is determined and attained. Further, the movement of grasping support members, the grasping clamps, and the grasping fingers is performed and controlled via one or more actuators (as applicable and may be changed based on the design requirement) until force sensor feedback is obtained in real time. This ensures contact force is intact thus refraining from any slipping by the fingers/bellows during the grasping of object (s) in real time.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A gripper apparatus for grasping one or more objects, comprising:
    a mounting adaptor comprising an inner surface and an outer surface;
    a first actuator and a second actuator mounted on the inner surface of the mounting adaptor using a plurality of screws;
    a plurality of clamp supporting members, wherein each of the plurality of clamp supporting members is coupled to at least one of the first actuator and the second actuator;
    a plurality of grasping clamps, wherein a first set of grasping clamps are coupled to a first clamp supporting member of the plurality of clamp supporting members, wherein a second set of grasping clamps are coupled to a second clamp supporting member of the plurality of clamp supporting members, and wherein a third set of grasping clamps are coupled to a third clamp supporting member of the plurality of clamp supporting members, and wherein each grasping clamp from each of the first set of grasping clamps, the second set of grasping clamps and the third set of grasping clamps is positioned opposite to one another;
    at least one sliding friction pad attached to a corresponding inner surface of each of the plurality of grasping clamps;
    at least one grasping finger coupled at one end of each grasping clamp of the plurality of grasping clamps, wherein the at least one grasping finger comprises a suction cup; and
    at least one sensor array positioned between (i) each grasping clamp of the plurality of grasping clamps and (ii) the at least one sliding friction pad, wherein during grasping of at least one object in real time,
    the plurality of clamp supporting members are actuated by at least one of the first actuator and the second actuator for movement in at least one direction based on one or more grasping points being estimated, wherein the one or more grasping points are estimated using captured information by an electronic device, and wherein the captured information comprises size, shape, surface, and an orientation of the at least one object, wherein each of the plurality of grasping clamps is actuated for expansion or collapsing based on (i) the movement of the plurality of clamp supporting members in real-time and (ii) an amount of collapsing and expansion of the plurality of grasping clamps being estimated based on the captured information by one or more hardware processors,
    wherein the at least one sliding friction pad is actuated to slide from one position to another position until center of gravity is determined, based on sensory information received from the at least one sensor array pertaining to force applied on the at least one object,
    wherein based on the determined center of gravity, the at least one grasping finger is configured for at least one of expansion or collapse to change an associated initial position to another position to firmly grasp the at least one object.

2. The gripper apparatus as claimed in claim 1, wherein the at least one of the first actuator and the second actuator are actuated until a force sensor feedback is obtained from the at least one grasping finger coupled at each of the plurality of grasping clamps.

3. The gripper apparatus as claimed in claim 2, wherein the force sensor feedback comprises information specific to contact force and one or more slipping parameters associated with grasping of the at least one object in real time.

4. The gripper apparatus as claimed in claim 1, wherein the at least one object is displaced from an initial position to a desired position using a linear slider mechanism part of the plurality of grasping clamps.

5. The gripper apparatus as claimed in claim 1, wherein the at least one grasping finger is a variable angle controlling finger.

6. The gripper apparatus as claimed in claim 1, wherein the first actuator and the second actuator are one of a hydraulic actuator or a pneumatic actuator.

7. A method for grasping one or more objects using a gripper apparatus, comprising:
    obtaining, information of at least one object to be grasped, wherein the information comprises size, shape, surface, and an orientation of the at least one object;
    estimating (i) one or more grasping points, and (ii) an amount of collapsing and expansion of a plurality of grasping clamps, based on the captured information;
    actuating at least one of a first actuator and a second actuator of the gripper apparatus for movement of a plurality of clamp supporting members of the gripper apparatus in at least one direction based on the estimated one or more grasping points;
    actuating the plurality of grasping clamps of the gripper apparatus for expansion or collapsing based on (i) the movement of the plurality of clamp supporting members in real-time and (ii) the estimated amount of collapsing and expansion of the plurality of grasping clamps;
    actuating at least one sliding friction pad, attached to a corresponding inner surface of each of the plurality of grasping clamps, to slide from one position to another position until center of gravity is determined, based on sensory information received from at least one sensor array pertaining to force applied on the at least one object; and
    based on the determined center of gravity, actuating at least one grasping finger of each of the plurality of grasping clamps for at least one of expansion or collapse to change an associated initial position to another position to firmly grasp the at least one object.

8. The method as claimed in claim 7, wherein the at least one of the first actuator and the second actuator are actuated until a force sensor feedback is obtained from the at least one grasping finger coupled at each of the plurality of grasping clamps.

9. The method as claimed in claim 8, wherein the force sensor feedback comprises information specific to contact force and one or more slipping parameters associated with grasping of the at least one object in real time.

10. The method as claimed in claim 7, wherein the at least one object is displaced from an initial position to a desired position using a linear slider mechanism part of the plurality of grasping clamps.

11. The method as claimed in claim 7, wherein the at least one grasping finger is a variable angle controlling finger.

12. The method as claimed in claim 8, wherein the first actuator and the second actuator are one of a hydraulic actuator or a pneumatic actuator.

* * * * *